(12) United States Patent
Kwon et al.

(10) Patent No.: US 9,495,416 B2
(45) Date of Patent: Nov. 15, 2016

(54) METHOD, APPARATUS, AND SYSTEM TO RECOMMEND MULTIMEDIA CONTENTS USING METADATA

(71) Applicant: KOREA INSTITUTE OF SCIENCE AND TECHNOLOGY, Seoul (KR)

(72) Inventors: Yong-Moo Kwon, Seoul (KR); Chang Hyeon Lee, Seoul (KR); Fathoni Arief Musyaffa, Seoul (KR)

(73) Assignee: Korea Institute of Science and Techonology, Seoul (KR)

( * ) Notice: Subject to any disclaimer, the term of this patent is extended or adjusted under 35 U.S.C. 154(b) by 89 days.

(21) Appl. No.: 13/690,439

(22) Filed: Nov. 30, 2012

(65) Prior Publication Data

US 2014/0074879 A1    Mar. 13, 2014

(30) Foreign Application Priority Data

Sep. 11, 2012   (KR) .................. 10-2012-0100422

(51) Int. Cl.
*G06F 17/30*   (2006.01)

(52) U.S. Cl.
CPC ... *G06F 17/30424* (2013.01); *G06F 17/30038* (2013.01)

(58) Field of Classification Search
USPC .................. 707/706–769; 715/739
See application file for complete search history.

(56) References Cited

U.S. PATENT DOCUMENTS

| | | | |
|---|---|---|---|
| 6,088,717 A * | 7/2000 | Reed et al. ................ 709/201 |
| 8,365,306 B2 * | 1/2013 | Maes .......................... 705/51 |
| 8,666,961 B1 * | 3/2014 | Qureshi et al. ............. 707/705 |
| 8,898,698 B2 * | 11/2014 | Fleischman ........ H04N 21/2407 725/34 |
| 2002/0042923 A1 * | 4/2002 | Asmussen et al. ............. 725/92 |
| 2003/0152277 A1 * | 8/2003 | Hall et al. .................... 382/229 |
| 2005/0076365 A1 * | 4/2005 | Popov .................... H04N 7/163 725/46 |
| 2006/0041591 A1 * | 2/2006 | Rhoads ..................... 707/104.1 |
| 2006/0288006 A1 * | 12/2006 | Eschbach et al. ............... 707/6 |
| 2007/0244924 A1 * | 10/2007 | Sadovsky ......... G06F 17/30035 |
| 2008/0077574 A1 * | 3/2008 | Gross ............... G06F 17/30699 |
| 2008/0256100 A1 * | 10/2008 | van de Sluis et al. ....... 707/100 |
| 2011/0099156 A1 * | 4/2011 | Libin et al. .................. 707/706 |

(Continued)

FOREIGN PATENT DOCUMENTS

| | | |
|---|---|---|
| KR | 10-0884109 B1 | 2/2009 |
| KR | 10-2009-0036896 A | 4/2009 |
| KR | 10-2009-0046361 | 5/2009 |

OTHER PUBLICATIONS

Wei Liu, et al., "SoPhoNet: Photo Sharing Based on Participatory Sensing," IEEE International Conference on Internet of Things, and Cyber, Physical and Social Computing, 2011 (8 pages, in English).

*Primary Examiner* — Hanh Thai
(74) *Attorney, Agent, or Firm* — NSIP Law

(57) ABSTRACT

A method, apparatus, and system are configured to recommend content using metadata including an event metadata unit, a searching unit, and a control unit. The event metadata generating unit is configured to generate event metadata regarding content selected by a user. The searching unit which, on the basis of the generated event metadata and social metadata regarding content uploaded to an SNS server associated with the user, is configured to search the content uploaded to the SNS server to recommend content to be provided to the user. The control unit is configured to provide the recommended content to the user using the social metadata regarding the searched recommended content.

15 Claims, 13 Drawing Sheets

(56) References Cited

U.S. PATENT DOCUMENTS

| | | | |
|---|---|---|---|
| 2011/0173570 A1* | 7/2011 | Moromisato et al. | 715/838 |
| 2011/0208750 A1* | 8/2011 | Miyazaki | G06F 17/30997 707/748 |
| 2011/0307425 A1* | 12/2011 | Wang et al. | 706/12 |
| 2012/0054278 A1* | 3/2012 | Taleb et al. | 709/204 |
| 2012/0191715 A1* | 7/2012 | Ruffner | G06F 17/30011 707/738 |
| 2013/0036117 A1* | 2/2013 | Fisher | G06F 17/30041 707/736 |
| 2013/0067346 A1* | 3/2013 | Rosenstein et al. | 715/741 |
| 2013/0110929 A1* | 5/2013 | Gundotra et al. | 709/204 |
| 2013/0151339 A1* | 6/2013 | Kim et al. | 705/14.55 |
| 2013/0263184 A1* | 10/2013 | Melnychenko et al. | 725/50 |
| 2013/0283329 A1* | 10/2013 | Huang et al. | 725/114 |
| 2013/0297447 A1* | 11/2013 | Sakata | 705/26.7 |
| 2014/0006391 A1* | 1/2014 | Friedlander et al. | 707/723 |
| 2014/0085485 A1* | 3/2014 | Gavita et al. | 348/207.1 |

\* cited by examiner

FIG. 6

| Media Upload & Creating CAM | |
|---|---|
| Select File | [Find] |
| Date Created (YYYY-MM-DD) | |
| Select Weather | warm ▼ |
| Contents type | image ▼ |
| Loacation | |
| With Whom | |
| Event | |
| Creator | |

[OK] [Cancel]

FIG. 12

| Since (YYYY-MM-DD) | : | 2012-04-21 |
| Until (YYYY-MM-DD) | : | 2012-04-24 |
| Location | : | Seoul |
| Event | : | ICE |
| Organization | : | KIST |

~601

☑ Find the following tagged user(s)
With : Jake, Bob

~602

☑ Find the following comment content
Comment content : See you

~603

Submit Query ~605
Facebook Logout
604

METHOD, APPARATUS, AND SYSTEM TO RECOMMEND MULTIMEDIA CONTENTS USING METADATA

CROSS-REFERENCE TO RELATED APPLICATION

This application claims the benefit under 35 U.S.C. §119(a) of Korean Patent Application No. 10-2012-0100422, filed on Sep. 11, 2012, in the Korean Intellectual Property Office, the entire disclosure of which is incorporated herein by reference.

BACKGROUND

1. Field

The following description relates to a method, apparatus, and system to recommend content to a user, and more particularly, to a method and apparatus to search and recommend particular content using metadata regarding selected content and metadata stored in a social network service (SNS) server.

2. Description of the Related Art

As the demand for mobile terminals has been increased and the technology thereof has been developed, people continuously upload multimedia content taken by using the mobile terminals to an online service (for example, social network service (SNS), Blog, online communities, and the like) and show other people the uploaded content or exchange opinions, thereby forming social networks.

In addition, as the use of online services has been increased, a large amount of content taken or recorded by users is uploaded to the online services. Searching the large amount of content uploaded for particular content requested from a user takes a long time and is not easy. For example, in order to produce a new album for a trip last week with friends, among other photographs taken by the album producer, the producer may also wish to include photographs taken by his friends who participated in the trip. In this case, there is a problem in that the album producer has to obtain the needed photographs by visiting each online service addresses of his friends who took part in the trip. FIG. 1 is a configuration diagram of a process of browsing content uploaded by the friends to their online albums, homepages, photograph albums, and the like to produce an album according to the related art. As shown in FIG. 1, there is a problem in that the album producer has to browse and select files uploaded to the homepage, a wall, or the like of each of the friends.

Therefore, a method is needed that can automatically receive associated content by inputting particular information, without a user having to directly search for content associated with a particular event. Furthermore, a method of preferentially recommending content more appropriate for a search intention of a user using various types of information regarding content uploaded to online services is required.

SUMMARY

The present disclosure is directed to searching an SNS server for content highly associated with content selected by a user using metadata of the selected content and metadata about content that is present in the SNS server to be provided to the user.

In accordance with an illustrative example, there is provided a method to recommend content using metadata, including generating event metadata of content selected by a user; searching content uploaded to the SNS server as recommended content to be provided to the user, based on the generated event metadata and social metadata of the content uploaded to an SNS server associated with the user; and providing the recommended content to the user using the social metadata of the searched recommended content.

The generating of the event metadata of the content selected by the user includes generating the metadata of the selected content based on metainformation input by the user.

The metainformation input by the user includes at least one of title, event name, file creator information, weather information, and location information of the selected content.

The metainformation input by the user further includes at least one content type information, weather information, information on tagged persons, particular keywords included in comments, information on persons who input comments, information on persons who shares a corresponding post, and information on persons who click checkboxes indicating positive/negative, regarding the content uploaded to the SNS server.

The SNS server associated with the user includes at least one of an online community server, an SNS provider server, and a blog service provider server.

The searching for the recommended content to be provided to the user includes searching the SNS server for social metadata includes the same components as at least one component of the generated event metadata, and searching the SNS server for recommended content regarding the searched social metadata.

The social metadata includes at least one of the recommended content, title, event name, date information, location information, information on tagged persons, particular keywords included in comments, number of shares, information on persons who share a corresponding post, file creator information, number of selections of checkboxes indicating positive/negative and information on persons who select the checkboxes, the number of comments, social relation information between an uploader who uploads content to the SNS server and the user, and number of persons who input comments regarding the recommended content.

The providing of the recommended content to the user includes calculating a recommendation value using the social metadata regarding the recommended content, and providing the recommended content to the user by reflecting the calculated recommendation value.

In the calculating of the recommendation value, the recommendation value is calculated using at least one of popularity of the recommended content, the social relation information between the user and the uploader, and similarity between the selected content and the recommended content.

The popularity is calculated using at least one of the number of shares of the recommended content, the number of comments, and the number of selections of a checkbox indicating positive for the recommended content, the social relation information is calculated using at least one of whether or not having a family relationship, whether or not being a fellow worker, and whether or not being a school alumni, and the content similarity is calculated for the recommended content using at least one of location, comment, information on tagged persons, and album description information.

The recommendation value is calculated using $RS(u,i)=\alpha*S_f(i)+\beta*p(u,v)+\gamma*t(i,k)$, wherein $RS(u,i)$ is the recommendation value, $S_f(i)$ represents the popularity of the recommended content, $p(u,v)$ represents the social relation information, and t(i,k) is the similarity between the event metadata and the recommended content, and $\alpha$, $\beta$, and $\gamma$ are arbitrary real numbers.

The selected content and the uploaded content comprise one or more of image content, video content, and music content.

In the generating of the event metadata of the content selected by the user, the selected content is image content, and generating the event metadata regarding the selected content to be uploaded using exchangeable image file format (EXIF) information of the image content is included.

In accordance with an illustrative example, there is provided a computer system configured to recommend content using metadata, including an event metadata generating unit configured to generate event metadata regarding content selected by a user; a searching unit which, on the basis of the generated event metadata and social metadata regarding content uploaded to an SNS server associated with the user, is configured to search the content uploaded to the SNS server to recommend content to be provided to the user; and a control unit configured to provide the recommended content to the user using the social metadata regarding the searched recommended content.

The metadata generating unit is configured to generate the metadata of the selected content on the basis of metainformation input by the user.

The metainformation includes at least one of title, event name, file creator information, weather information, location information, content type information, information on tagged persons, particular keywords included in comments, information on persons who input comments, and information on persons who click checkboxes indicating positive/negative, regarding the selected content, and the SNS server associated with the user includes at least one of an online community server, an SNS provider server, and a blog service provider server.

The social metadata includes at least one of, regarding the recommended content, title, event name, date information, location information, information on tagged persons, particular keywords included in comments, the number of shares, information on persons who share a corresponding post, file creator information, the number of selections of checkboxes indicating positive/negative and information on persons who select the checkboxes, the number of comments, the number of persons who input comments, and social relation information between an uploader who uploads content to the SNS server and the user, and the social relation information includes at least one of whether or not being a friend registered on a social network service associated with the SNS server, family relationship information, workspace information, and school information.

The control unit includes an operation unit configured to calculate a recommendation value using social metadata regarding the recommended content, and the recommended content is provided to the user by reflecting the calculated recommendation value.

A storage unit is configured to store the content selected by the user and the event metadata.

In accordance with an illustrative example, there is provided a non-transitory computer program embodied on a computer readable medium, the computer program being configured to control a processor to perform a program code to recommend content using metadata, and performing generating event metadata of content selected by a user; on the basis of searching content uploaded to the SNS server as recommended content to be provided to the user, based on the generated event metadata and social metadata of the content uploaded to an SNS server associated with the user; and providing the recommended content to the user using the social metadata of the searched recommended content.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 6 shows an exemplary screenshot of an input window for inputting metainformation by a user, according to an embodiment;

FIG. 12 is a screenshot showing an input window for a metadata region that is automatically input and regions for manual input, according to an embodiment.

DETAILED DESCRIPTION

Figure 1:
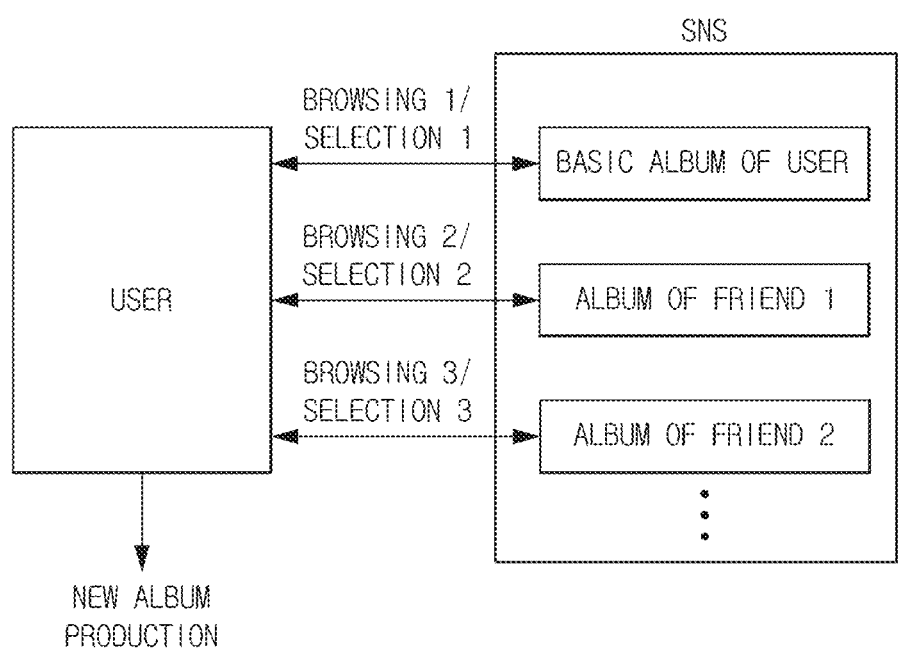
FIG. 1 is a configuration diagram of a process to search for content uploaded by friends to produce an album.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Throughout the drawings and the detailed description, unless otherwise described, the same drawing reference numerals will be understood to refer to the same elements, features, and structures. The relative size and depiction of these elements may be exaggerated for clarity, illustration, and convenience.

According to a method and apparatus to recommend content using metadata, the user may receive and browse a number of pieces of recommended content and then select a set of contents from the recommended contents to create a new album by using a multimedia contents recommendation system, without having to directly access the wall, timeline, album, or the like of each of friends.

Figure 2:
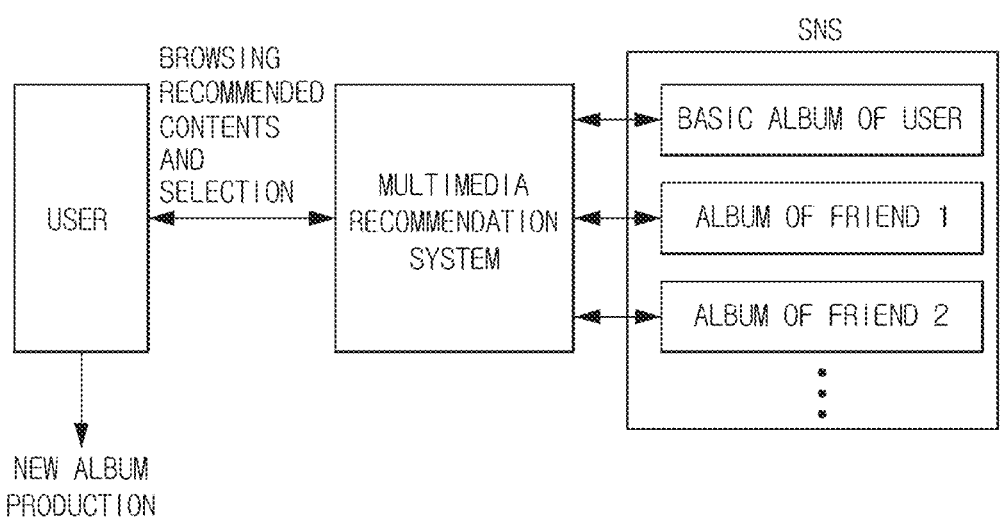
FIG. 2 is a configuration diagram of a content recommendation system and a process of using the same, according to an embodiment.

As shown in FIG. 2, a method of recommending content enables the user to easily and rapidly acquire content owned by friends and needed for the user through online social networks. In addition, this is helpful in producing online social albums that need cooperation, online social authoring tool services, social UCC, and the like.

Figure 3:
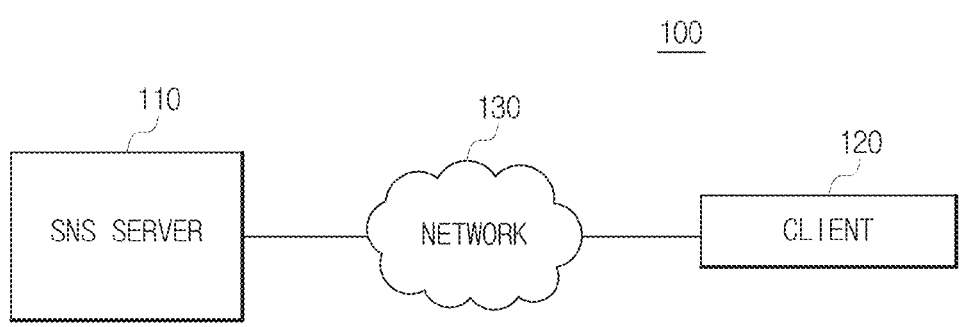
FIG. 3 is a high-level block diagram showing a computer environment 100 for recommending content using metadata, according to an embodiment.

FIG. 3 is a high-level block diagram showing a computer environment 100 for recommending content using metadata according to an embodiment. The computer environment 100 includes a social network service (SNS) server 110 and a client 120 which are connected to communicate to each other through a network 130. To simplify the various illustrative configurations described, only one of each of the SNS server 110, the client 120, and the network 130 is shown. It is to be appreciated that multiple servers, clients, and networks may be present in the computer environment 100.

The SNS server 110 is a hardware device and/or a software program and is configured to provide a social network service to the client 120 or other systems. The social network service includes a service that stores, shares, and displays various types of content uploaded by service users to the SNS server 110 so as to be provided to other service users.

The SNS server 110 may be linked to the client 120 to provide social metadata and recommended content to the client 120. In addition, the number of SNS servers 110 linked to a computer system, according to another embodiment, may be one or a plurality of servers. The SNS server 110 may be one of an online community server, an SNS provider server, and a blog service provider server. For example, the SNS server 110 may include FACEBOOK, CYWORLD, GOOGLE, DAUM, NAVER, FLICKR, TWITTER, LINKNOW, WEEBLY, TODOLY, RAINMAKER, SEESMIC, SLIDEROCKET, and the like. In addition, according to an embodiment, the SNS server 110 may be homepages of registered friends of a user who wants to receive recommended content, or web pages such as a timeline or wall of FACEBOOK or other types of social networking website, service, or media that would allow registered users to create profiles, upload photos and video, send messages. That is, according to an embodiment, the SNS server 110 may be an arbitrary server to which files may be uploaded or linked by other users who are registered as friends of the user. The SNS server 110 allows the user to receive the recommended content (or with whom a neighboring social network such as "knowable friend" is formed even in a case of not being registered).

In addition, according to an embodiment, the content may be multimedia content including one or more of images, video, music, and text.

The network 130 enables communication between the server 110 and the client 120. According to an embodiment, the network 130 uses standard communication techniques/protocols. Therefore, the network 130 may include links using techniques such as Ethernet, 802.11, worldwide interoperability for microwave access (WiMAX), 2G/3G/4G, digital subscriber line (DSL), asynchronous transfer mode (ATM), infiniband, and PCI Express Advanced Switching. Similarly, the networking protocols used on the network 130 include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. Data exchanged on the network 130 may be shown by using techniques and/or formats including image data in binary forms (for example, Portable Network Graphics (PNG)), hypertext markup language (HTML), extensible markup language (XML), and the like. Additionally, the entirety or a part of the links may be encrypted using encryption techniques according to the related art such as secure sockets layer (SSL), transport layer security (TLS), virtual private networks (VPNs), and Internet Protocol security (IPsec).

In one illustrative example, the client 120 is a computer system and is configured to generate event metadata regarding content designated to be uploaded to a server and search for recommended content using social metadata, thereby recommending the content to a user (or an author). The client 120 may be a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

Figure 4:
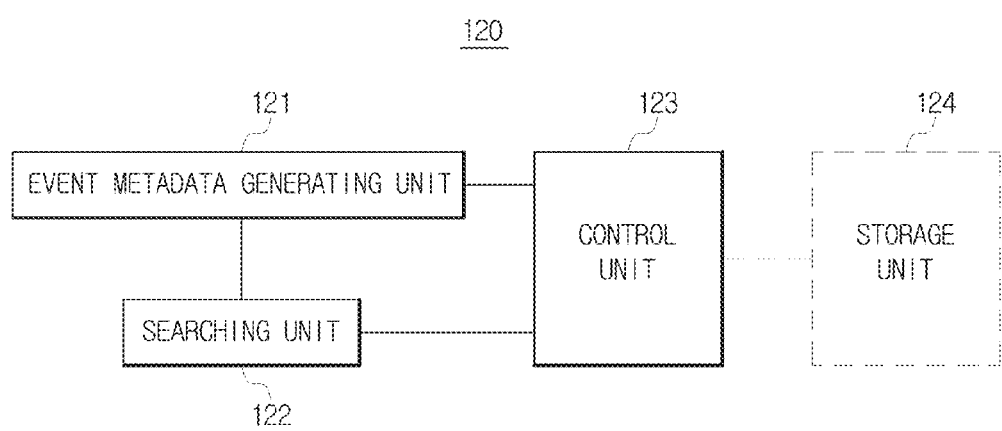
FIG. 4 is a configuration diagram of a client, according to an embodiment.

FIG. 4 is a configuration diagram of the client according to an embodiment. As shown in FIG. 4, the client 120 includes an event metadata generating unit 121, a searching unit 122, and a control unit 123.

In addition, according to another embodiment, the client 120 further includes a storage unit 124. The storage unit 124 stores content selected by users and event metadata. In addition, the storage unit 124 stores searched social metadata and recommended content.

The event metadata generating unit 121 is a hardware device and/or a software program and generates event metadata regarding content selected by the user to be uploaded. According to an embodiment, the event metadata generating unit 121 may generate the event metadata in an XML format.

Figure 5:
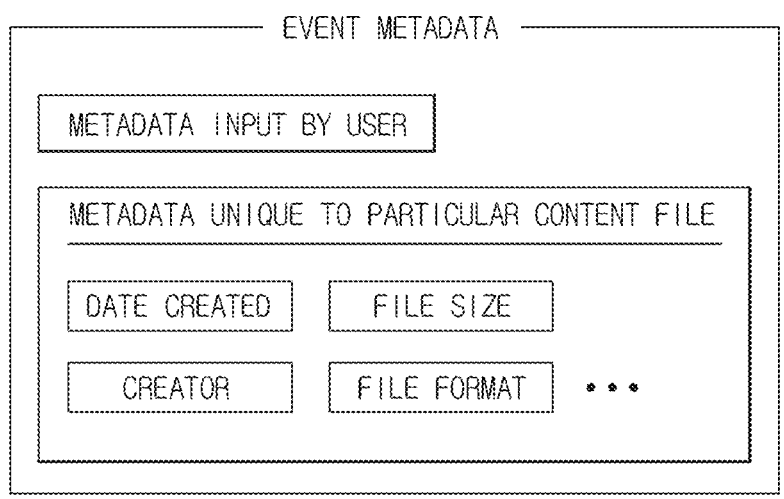
FIG. 5 shows examples of event metadata.

FIG. 5 shows examples of the event metadata. As shown in FIG. 5, the event metadata includes i) metainformation input by the user, ii) metadata unique to a particular content file, and the like. The metadata unique to a particular content file may be date created, creator, file size, file format, and the like of the particular content file. According to an embodiment, the metainformation input by the user may be one of title, event name, file creator information, date information, and location information regarding the content selected to be uploaded.

FIG. 6 shows an exemplary screenshot of an input window for inputting metainformation by the user according to an embodiment. As shown in FIG. 6, the user may select a particular content file and input metainformation regarding the selected content file. The input metainformation may be included in the selected file or stored separately.

As shown in FIG. 6, the user may input particular date, weather, content type, location, with whom, and event name as the metainformation regarding the selected content file. For example, in consideration of a case of uploading photographs taken with friends on "International Culture Exchange Festival" held under the auspices of Korea Institute of Science and Technology (KIST) in Seongbuk-gu, Seoul, Republic of Korea on Sep. 8, 2012, the user may enter "KIST Festival" as the title of the content, "International Culture Exchange Festival" as the event name, "KIST" as the host information, "Sep. 8, 2012" as the date information, and "Seongbuk-gu, Seoul" as the location information. The entered items (that is, the metainformation) may be generated as the event metadata in an XML format by the metadata generating unit.

Table 1 as follows shows an example and details of the event metadata input by the user.

TABLE 1

| XML format | Components | Acquisition method | Use method |
|---|---|---|---|
| Content information | Content type | User input | Particular content type search |
| | Creator | User input | Uploader prediction |
| | With whom | User input | Search for photograph including particular person |
| | Location | User input | Search for photograph taken at particular location |
| | Event name | User input | SNS information comparison |
| | Date, time | User input | SNS information comparison |
| | Weather | User input | |

According to an embodiment, the metainformation input by the user may include one or more types of information including content type information, weather information, information on tagged persons, particular keywords included in comments, information on persons who input comments, and information on persons who click checkboxes indicating positive/negative, regarding the content uploaded to the SNS server.

The metadata unique to the designated content file may be the time created, capacity, and content type (for example, whether the content file extension is jpg, avi, or the like) of the corresponding content file. According to an embodiment, in a case where the designated content file is an image content taken by a digital camera, detailed additional information (that is, Exchangeable Image File Format (EXIF) information) provided by the functions of a camera, such as, image data (photograph information) and camera manufacturer, camera model, software that edits images, date of photograph correction, shooting date, exposure time, shooting method, focal length, aperture value, shutter speed, whether flash is fired, GPS information, date and time original/record, and copyright may be the event metadata.

Metadata regarding date and location of content may be recommended to the user when the user directly requires content recommendation through the client 120, and IP address connected to the user, actual location, and time information may be the metadata. In general, photographs are uploaded in a few days after an event. Thus the time information may favorably function as metadata associated with a particular event.

The searching unit 122 is configured to search the content uploaded to the SNS server for recommended content to be provided to the user based on the event metadata and the social metadata.

The social metadata may be referred to as metadata regarding the content uploaded to the SNS server 110. The searching unit 122 may use the event metadata and the social metadata to search for recommended content to be provided to the user from the SNS server 110. In addition, the social metadata may be used to calculate a recommendation value of the recommended content and may recommend more appropriate content to the user using the recommendation value.

The social metadata may be one or more of title, event name, date information, location information, information on tagged persons, particular keywords included in comments, the number of shares, information on persons who share a corresponding post, file creator information, the number of selections of checkboxes indicating positive/negative (for example, the number of clicks of like in case of FACEBOOK or other similar social networking service, and checkboxes indicating thumbs-up and thumbs-down signs in case of YOUTUBE or other similar video-sharing website) and information on persons who select the checkboxes, the number of comments, and the number of persons who input comments, regarding the recommended content. In addition, the social metadata may include social relation information between an uploader who uploads content to the SNS server and the user. The social relation information may be information including one or more of whether the uploader is a friend registered on a social network service associated with the SNS server, family relationship information, workplace information, and school information.

Table 2 shows an example and details of the social metadata.

TABLE 2

| XML format | Components | Acquisition method | Use method |
|---|---|---|---|
| SNS information | The number of selections of checkboxes indicating positive/negative | SNS server side API is used (for example, facebook API) | Particular content type search |
| | The number of comments | SNS server side API is used (for example, facebook API) | Uploader prediction |
| | Album description | SNS server side API is used (for example, facebook API) | Search for photograph including particular person |
| | Tag information (information tagged on persons) | SNS server side API is used (for example, facebook API) | Search for photograph taken at particular location |
| | Content of comments | SNS server side API is used (for example, facebook API) | SNS information comparison |
| | Information on persons who input comments | SNS server side API is used (for example, facebook API) | SNS information comparison |
| | The number of shares or links | SNS server side API is used (for example, facebook API) | |

The searching unit 122, according to an embodiment, may be a hardware device or a software program.

According to an embodiment, the searching unit 122 searches the SNS server 110 for social metadata and recommended content through the network 130. In addition, the searching unit 122 requests the searched recommended content from the SNS server 110 and may receive the requested recommended content. For example, the searching unit 122 searches the SNS server 110 for social metadata that includes the same or similar components to at least a part of the components of the event metadata generated by the event metadata generating unit 121. In addition, the searching unit 122 searches for content regarding the searched social metadata and receives the recommended content. In this case, the recommended content itself may be received or a reduced form of the recommended content (for example, thumbnail image, initial screen of video, file information, and the like).

Figure 7:
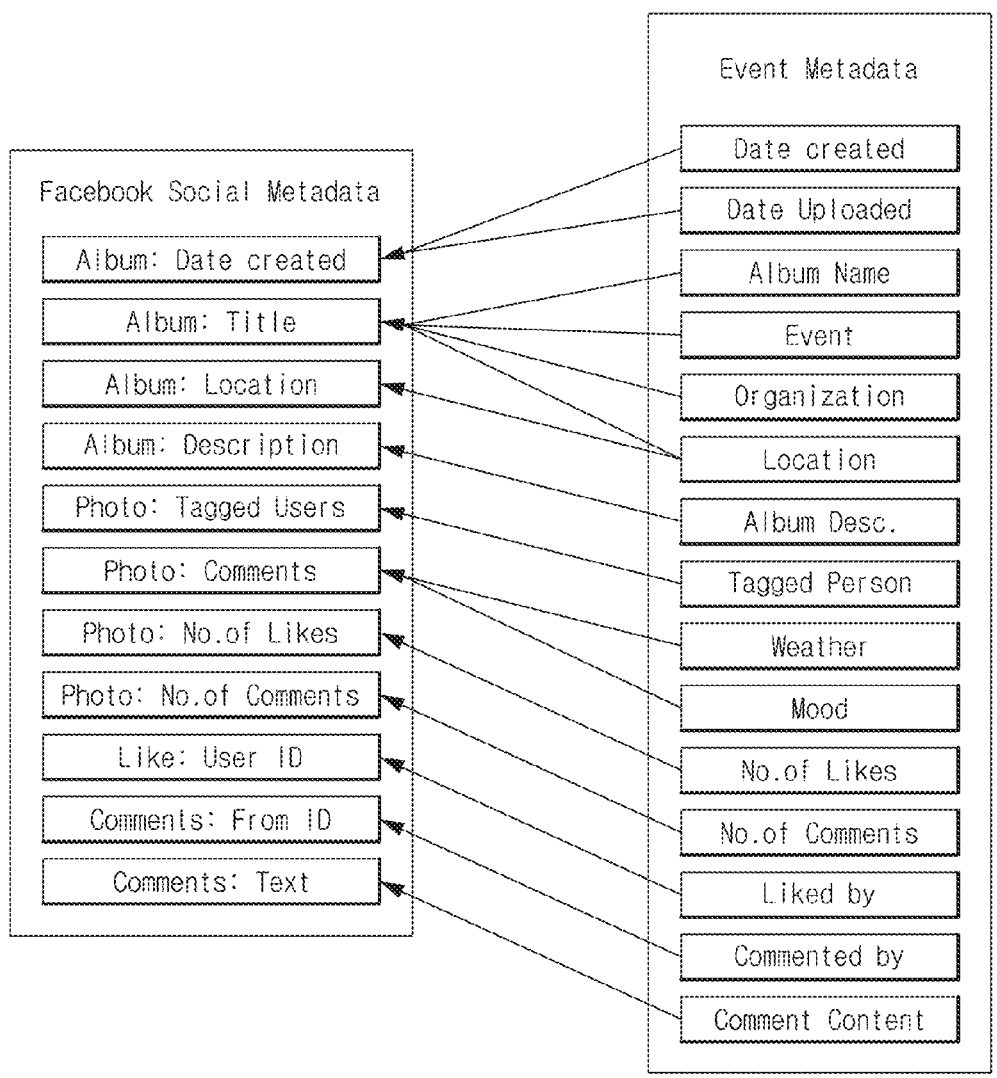
FIG. 7 is a configuration diagram showing a correlation between social metadata of FACEBOOK and the event metadata, according to an embodiment.

FIG. 7 is a high-level configuration diagram showing a correlation between the social metadata of FACEBOOK and the event metadata according to an embodiment. It can be appreciated that although FACEBOOK is used, other similar social metadata of other social networking service may be implemented in the illustrated embodiment. Referring to FIG. 7, information on album name, event name, organization, and location is shown as the event metadata corresponding to album title of the social metadata. The searching unit 122 searches social metadata by determining the sameness/similarity of the corresponding components.

The control unit 123, according to an embodiment, is configured to provide recommended content to the user based on the social metadata of the recommended content searched by the searching unit 122.

Figure 8:
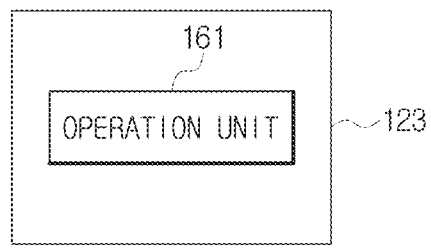
FIG. 8 is a configuration diagram of a control unit 123, according to an embodiment.

FIG. 8 is a configuration diagram of the control unit 123 according to an embodiment. The control unit 123 includes an operation unit 161 configured to calculate a recommendation value using the social metadata regarding the recommended content.

The control unit 123 provides the recommended content to the user through various computing devices. For example, the recommended content may be provided to the user through web pages, additional computer programs, or applications of smart electronic devices.

Because the event metadata and the social metadata include a plurality of components, recommended content may be searched for that includes metadata of which a single component is the same and recommended content that includes social metadata of which two (or more) components are the same. In addition, social metadata that has more components that are the same as those of the event metadata may be content more appropriate for the request of the user. Therefore, the searched recommended content would be selected and provided to the user and, thus, the control unit 123 would calculate recommendation values of the recommended content and select and provide the recommended content appropriate for the user's intention based on the recommendation values.

According to an embodiment, the operation unit 161 calculates recommendation values using Equations 1 to 4 as follows.

$$RS(u,i) = \alpha * S_f(i) + \beta * p(u,v) + \gamma * t(i,k) \quad \text{[Equation 1]}$$

In Equation 1, RS is the recommendation value, $S_f(i)$ represents the popularity of the recommended content, p(u,v) represents the score of the social relation between the user and an uploader (for example, a friend on SNS) who uploads (or links) the recommended content. In addition, t(i,k) is the score that represents the content similarity between the social metadata and the content selected (or uploaded) by the user. Here, u is the user, v is a friend of the user (u) on SNS, i is the recommended content, and k are particular keywords as metainformation input by the user (that is, the event metadata). α, β, and γ are weightings of the respective items and may be determined as various values by the user as necessary. In addition, the user may define the α, β, and γ in advance as predetermined arbitrary real numbers. In one example, the weightings may be determined so that the maximum value of RS becomes 1.

$$S_f(i) a * \text{Shares}(i) + b * \text{comments}(i) + c * \text{Likes}(i) \quad \text{[Equation 2]}$$

Equation 2 is a mathematical expression about the popularity ($S_f$) of the recommended content. In Equation 2, Shares is a number of shares of the recommended content, comments is the number of comments of the recommended content, and likes is a number of selections of a checkbox indicating positive of the recommended content. For example, the likes may be the Like checkbox in a social networking service. In addition, a, b, and c are arbitrary real numbers including 0, and as the user provides different values to the symbols, the user may choose to receive recommended content regarding components highly valued by the user.

$$p(u,v) = \text{familyRelationship}(u,v) + \text{employersimilarity}(u,v) + \text{educationalsimilarity}(u,v) \quad \text{[Equation 3]}$$

In Equation 3, p(u,v) is a mathematical expression for calculating social relation information between the user to receive recommended content and the friend on SNS who uploads (or links) the recommended content. In one example, familyRelationship may be set to 1 point in a case of family relationship, employersimilarity may be set to 1 point in a case of fellow worker, educationalsimilarity may be set to 1 point in a case of school alumni, and the final relation score may be calculated by adding up the points. The point of each of the items during each calculation may be a point other than 1.

$$t(i,k) = \text{similar element1}(k\text{-location},t\text{-location}) + \text{similar element2}(k\text{-comments},t\text{-comment}) + \text{similar element3}(k\text{-tagged person},t\text{-tagged person}) + \text{similar element4}(k\text{-event name},t\text{-album name}) + \text{similar element5}(k\text{-event organizer},t\text{-album title}) \quad \text{[Equation 4]}$$

In Equation 4, t(i,k) is a mathematical expression for calculating the score regarding the similarity between the recommended content and the event metadata. The point of each of the similar elements is 1 point, and because the numbers of inputs of comment and taggedperson are two or more, the score may be calculated and measured through or operation. In addition, t(i,k) may be calculated using only a part of the 5 components shown in Equation 4. For example, content similarity may be calculated using one or more of the location, comments, information on tagged persons, and album description information like album name or title of the recommended content. That is, the album title of the recommended content and the event name of the selected content are compared to each other to determine whether they are the same and the like. The point of each of the components is also calculated.

According to an embodiment, the control unit 123 provides popular content with other users among recommended content using the social metadata. For example, in the case of the social networking service, whether or not it is popular with other users may be determined on the basis of "the number of Likes of corresponding content" and "the number of shares of the corresponding content" and/or "the number of comments of the corresponding content". In this case, the degree of popularity is determined using Equation 2.

According to another embodiment, the control unit 123 calculates the order of priority on the basis of keywords input by the user or information on particular persons and provides or outputs the content. For example, in a case where information on particular persons tagged to content to be searched is input as metainformation or metainformation to search comments of the content to be searched for particular keywords, recommended content is provided in a descending order or an ascending order based on the information on particular persons or the number of keywords.

Figure 9:
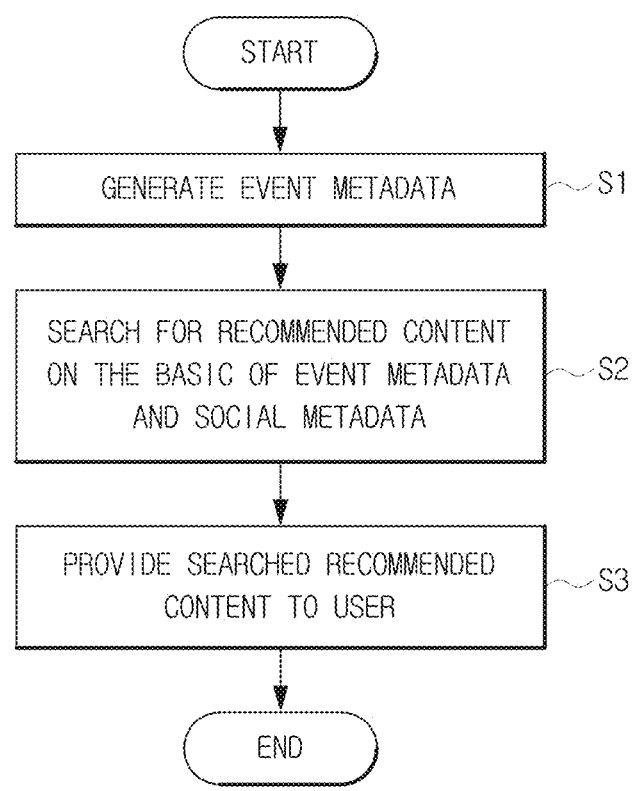
FIG. 9 is a flowchart of a method of recommending content using event metadata, according to an embodiment.

FIG. 9 is a flowchart of a method of recommending content using metadata according to an embodiment.

At operation (S1), an event metadata is generated about content selected by a user so as to be uploaded. The event metadata may include metainformation input by the user and may be generated in an XML format.

In addition, at operation (S2), searching content is uploaded to an SNS server as recommended content to be provided to the user based on the generated event metadata and social metadata. In one example, the social metadata means metadata regarding content uploaded to a social network server associated with the user.

According to an embodiment, the operation (S2) to search for the recommended content may include an operation to transmit the generated event metadata to the SNS server and to receive the recommended content from the SNS server.

According to another embodiment, the operation (S2) to search for the recommended content may include an operation of searching the SNS server for social metadata including the same components as, at least, one component of the generated event metadata and an operation of searching the SNS server for recommended content of the searched social metadata.

In addition, at operation (S3), of the recommended content is provided or output to the user using the social metadata of the searched recommended content. According to an embodiment, each of the components of the event metadata is compared to the social metadata of the recommended content, and the recommended content having a larger number of the same components is provided to the user.

Figure 10:
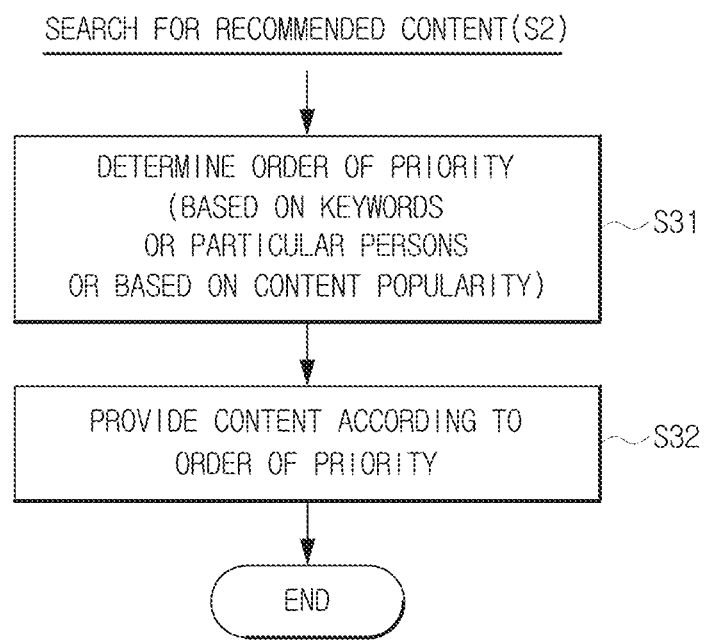
FIG. 10 is a detailed flowchart of an operation of providing recommended content, according to an embodiment.

FIG. 10 is a detailed flowchart of the operation of providing the recommended content (S3), according to an embodiment, after searching of recommended content (S2). The operation (S3) to provide the recommended content to the user may include an operation (S31) to determine the order of priority of the recommended content and an operation (S32) to provide or output the content according to the order of priority.

The operation (S31) to determine the order of priority of the recommended content is performed by a method to determine the order of priority described above or calculating the recommendation values. In addition, when the order of priority is determined as such, the recommended content is provided as a list in an ascending order or a descending order according to the order of priority.

According to another embodiment, in the description of the control unit 123, the recommendation values may be calculated using the social metadata, and the recommended content may be provided by reflecting the recommendation values. In order to calculate the recommendation values, the above Equations may be used.

Hereinafter, a computer program embodied on a non-transitory computer readable medium configured to receive the recommended content and edits the content will be described by exemplifying FACEBOOK as the SNS server 110, according to an embodiment.

Figure 11:
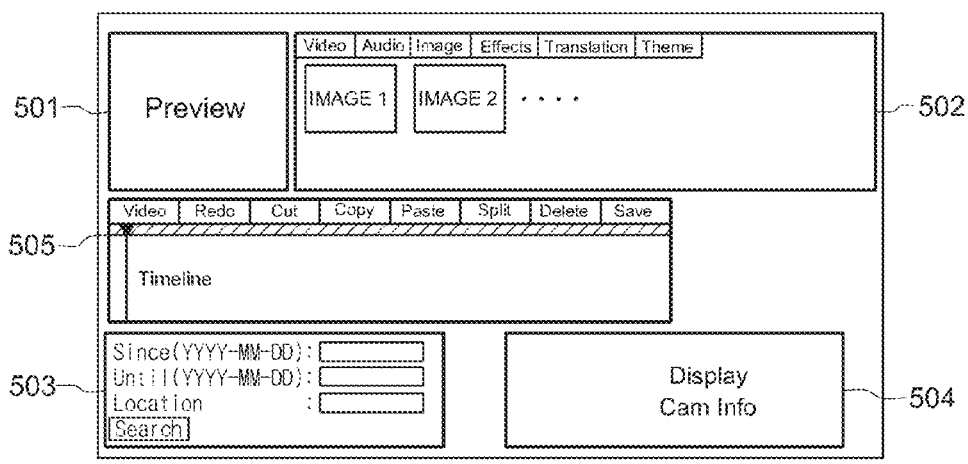
FIG. 11 is a screenshot of an application that performs the method of recommending content, according to an embodiment.

FIG. 11 is a screenshot of an application that performs the method of recommending content, according to an embodiment. The application may include, on a screen, a preview region 501, an uploaded content display region 502, a searching region 503, a metadata display region 504, and an editing region 505.

The preview region 501 may show a video made by integrating one or more of images, videos, and audios positioned in a timeline of the editing region 505. For example, when a plurality of image files and music files are placed in the timeline and the preview is executed, a video is played, which plays music while changing image files for a particular time.

The uploaded content display region 502 is a region that displays uploaded content to enable the user to perform content editing. As shown in FIG. 11, the content display region 502 is displayed by classifying types of content.

The searching region 503 directly receives metainformation from the user or automatically receives metadata, which is the metadata displayed on the metadata display region 504, through an operation of the user who selects particular content. FIG. 12 is a configuration diagram of the searching region, according to an embodiment. By generating the metadata using the metainformation input to the searching region and selecting a searching execution region 605, the recommended content may be provided through the above-described method.

According to an embodiment, when the content displayed on the metadata display region 504 is selected, metadata corresponding to a first recommendation reference 601 from the searching region of FIG. 12 may be automatically input. In addition, data regarding second and third recommendation references 602 and 603 may be input by the user, as needed, to search for recommended data.

Specifically, the user may search for content associated with the input metainformation.

FIG. 12 is a screenshot showing an input window of the metadata region 601, which is automatically input, and the regions 602 and 603, which are manually input, according to an embodiment. Referring to FIG. 12, the first recommendation reference includes 5 components. For example, when the first recommendation reference 601 is input and is used as the event metadata, as shown in FIG. 12, recommended content may be searched and received, according to the details input by the user, on the basis of event metadata including a period from Apr. 21, 2012 to Apr. 24, 2012, a location in Seoul, an event name of ICE, and a host of KIST.

In addition, as the user directly inputs additional metainformation, the user receives recommended multimedia appropriate for the user's intention. For example, the user may further input the second recommendation reference 602, the third recommendation reference 603, and the like. When the first and second recommendation references are input, content to which "Jake" and/or "Bob" is tagged, may be provided from content searched according to the first recommendation reference. In this manner, for example, in a case where "see you" is input as the third recommendation reference, content having "see you" in comments from the searched content may be provided to the user.

However, an SNS server access state 604 has to be an accessible state. As shown in FIG. 12, recommended content has to be searched in a state of logging in the social networking service. In a case of not logging in the SNS server 110, recommended content may not be searched. Therefore, the user has to log in one or more SNS servers 110. In addition, the user may log out by selecting "Facebook Logout" or "Logout."

The metadata display region 504 is a region that shows metadata of content selected by the user from the content displayed on the uploaded content display region 502. The metadata shown in the metadata display region 504 is the event metadata. In addition, the event metadata may be directly written and generated by the user or may be metadata that is automatically generated as a corresponding file is generated.

A region may be provided that displays the recommended content provided to the user according to the above-described method. According to an embodiment, the recommended content may be displayed using a table that shows the metadata of the recommended content. Otherwise, the recommended content may be displayed in thumbnail forms or icon forms according to file types.

In addition, content that includes a high calculated recommendation value may be displayed to be arranged at the top. In the alternative, in a case of an image, the image may be increased in size to be displayed as a highly associated image.

Figure 13:
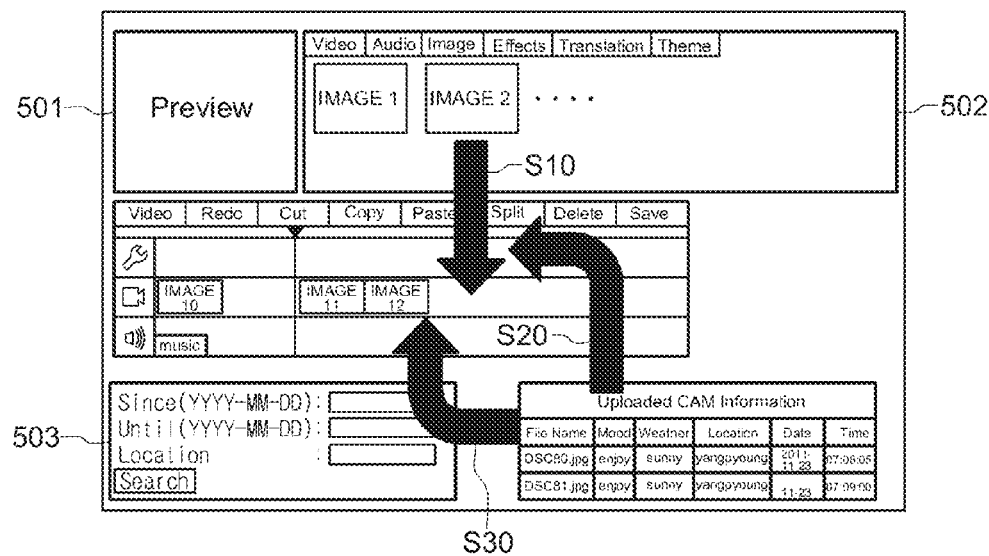
FIG. 13 is a screenshot showing a method of editing content according to an embodiment.

The editing region 505 is a region where an editing operation is performed on one or more pieces of content. FIG. 13 is a screenshot for explaining a method of editing content, according to an embodiment. The editing region 505 provides a base on which images, videos, music files, and the like are placed in the timeline and content that is made by combining a plurality of pieces of content is able to be produced. For example, needed content is dragged from the uploaded content display region 502 to a needed part of the editing region (S10), needed content is put from the metadata 504 into a needed part of the editing region, thereby editing various pieces of content into a single piece of multimedia content. In addition, various types of content, such as images and music files, may be present in the metadata display region 504. Therefore, the content may be put into the timeline of the editing region corresponding to the content type (S20 and S30).

Program instructions to perform a method of recommending content described herein, or one or more operations thereof, may be recorded, stored, or fixed as one or more computer-readable storage media. The program instructions may be implemented as a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

The units described herein may be implemented using hardware components and software components. For example, microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The method of recommending content according to an embodiment has been described with reference to the flowcharts proposed in the drawings. The method is shown and described by a series of blocks for simple description. However, the present disclosure is not limited to the order of the blocks. Several blocks may occur simultaneously or in a different order from that shown and described in the specification, and various different branches, flow paths, and block orders that achieve the same or similar results may be implemented. In addition, not all the shown blocks may be required to implement the method described in the specification. Furthermore, the method of recommending content may be implemented in a form of a computer program for executing the series of processes, and the computer program may be recorded on a computer-readable recording medium.

The terminology used in the specification is for the purpose of describing particular embodiments only and is not intended to be limiting of the present disclosure. The singular forms are intended to include the plural forms, unless the context clearly indicates otherwise. It should be understood that the terms "include", "have", and the like specify the presence of stated features, numbers, stages, operations, components, parts, and combinations thereof but do not preclude the presence or addition of one or more other features, numbers, stages, components, parts, and combinations thereof.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to recommend content using metadata, the method comprising:
generating, using one or more processors, event metadata of content selected by a user;
searching, using the one or more processors, content uploaded to a Social Network Service (SNS) server as recommended content to be provided to the user by comparing a compound to the generated event metadata and a component of social metadata of the content uploaded to the SNS server associated with the user; and
providing, using the one or more processors, the recommended content to the user using the social metadata of the searched recommended content,
wherein the providing of the recommended content to the user comprises:
calculating a recommendation value using predetermined weighting of the social metadata comprising a ranking of the social metadata will respect to the generated event metadata and using social relation information between the user and an uploader of the content uploading to the SNS server, and providing the recommended content to the user by reflecting the calculated recommendation value, wherein the generating of the event metadata of the content selected by the user includes generating the metadata of the selected content based on metainformation input by the user, and wherein the metainformation input by the user comprises at least one of title, event name, file creator information, weather information, and location information of the selected content.

2. The method to recommend content using metadata according to claim 1, wherein the metainformation input by the user further comprises at least one of content type information, weather information, information on tagged persons, particular keywords included in comments, information on persons who input comments, information on persons who shares a corresponding post, and information on persons who click checkboxes indicating positive/negative, regarding the content uploaded to the SNS server.

3. The method to recommend content using metadata according to claim 1, wherein the SNS server associated with the user comprises at least one of an online community server, an SNS provider server, and a blog service provider server.

4. The method to recommend content using metadata according to claim 1, wherein the searching for the recommended content to be provided to the user comprises:

searching the SNS server for social metadata comprises the same components as the component of generated event metadata, and searching the SNS server for recommended content regarding the searched social metadata.

5. The method to recommend content using metadata according to claim 1, wherein the social metadata comprises at least one of, regarding the recommended content, title, event name, date information, location information, information on tagged persons, particular keywords included in comments, number of shares, information on persons who share a corresponding post, file creator information, number of selections of checkboxes indicating positive/negative and information on persons who select the checkboxes, the number of comments, the social relation information between the uploader who uploads content to the SNS server and the user, and number of persons who input comments regarding the recommended content.

6. The method to recommend content using metadata according to claim 1, wherein, in the calculating of the recommendation value, the recommendation value is calculated using at popularity of the recommended content, or content similarity between the selected content and the recommended content.

7. The method to recommend content using metadata according to claim 6, wherein:

the popularity is calculated using at least one of a number of shares of the recommended content, a number of comments, and the number of selections of a checkbox indicating positive for the recommended content, the social relation information is calculated using at least one of whether or not having a family relationship, whether or not being a fellow worker, and whether or not being a school alumni, and the content similarity is calculated for the recommended content using at least one of location, comment, information on tagged persons, and album description information.

8. The method to recommend content using metadata according to claim 7, wherein the recommendation value is calculated using $RS(u,i)=\alpha*S_f(i)+\beta*p(u,v)+\gamma*t(i,k)$, wherein $RS(u,i)$ is the recommendation value, $S_f(i)$ represents the popularity of the recommended content, $p(u,v)$ represents the social relation information, and $t(i,k)$ is the similarity between the event metadata and the recommended content, and $\alpha$, $\beta$, and $\gamma$ are arbitrary real numbers.

9. The method to recommend content using metadata according to claim 1, wherein the selected content and the uploaded content comprise one or more of image content, video content, and music content.

10. The method to recommend content using metadata according to claim 1, wherein, in the generating of the event metadata of the content selected by the user, the selected content is image content, and generating the event metadata regarding the selected content to be uploaded using exchangeable image file format (EXIF) information of the image content is included.

11. A computer system configured to recommend content using metadata, comprising:

an event metadata generating unit, implemented by one or more processors, configured to generate event metadata regarding content selected by a user;

a searching unit, implemented by the one or more processors, which, by comparing a component of the generated event metadata and a component of social metadata regarding content uploaded to a Social Network Service (SNS) server associated with the user, is configured to search the content uploaded to the SNS server to recommend content to be provided to the user; and a control unit, implemented by the one or more processors, configured to provide the recommended content to the user using the social metadata regarding the searched recommended content, wherein the control unit comprises an operation unit configured to calculate a recommendation value using predetermined weighting of the social metadata comprising a ranking of the social metadata with respect to the generated event metadata and using social relation information between the user and an uploader of the content uploaded to the SNS server, wherein the recommended content is provided to the user by reflecting the calculated recommendation value, wherein the metadata generating unit is configured to generate the metadata of the selected content on the basis of metainformation input by the user, and the metainformation comprises at least one of title, event name, file creator information, weather information, location information, content type information, information on tagged persons, particular keywords included in comments, information on persons who input comments, and information on persons who click checkboxes indicating positive/negative, regarding the selected content.

12. The computer system configured to recommend content using metadata according to claim 11, wherein:

the SNS server associated with the user comprises at least one of an online community server, an SNS provider server, and a blog service provider server.

13. The computer system configured to recommend content using metadata according to claim 11, wherein:

the social metadata comprises at least one of, regarding the recommended content, title, event name, date information, location information, information on tagged persons, particular keywords included in comments, the number of shares, information on persons who share a corresponding post, file creator information, the number of selections of checkboxes indicating positive/negative and information on persons who select the checkboxes, the number of comments, the number of persons who input comments, and social relation information between the uploader who uploads content to the SNS server and the user, and the social relation information comprises at least one of whether or not being a friend registered on a social network service associated with the SNS server, family relationship information, workspace information, and school information.

14. The computer system configured to recommend content using metadata according to claim 11, further comprising a storage unit configured to store the content selected by the user and the event metadata.

15. A non-transitory computer program embodied on a computer readable medium, the computer program being configured to control a processor to perform a program code to recommend content using metadata, and performing:

generating event metadata of content selected by a user;

searching content uploaded to a Social Network Service (SNS) server as recommended content to be provided to the user by comparing a component of the generated event metadata and a component of social metadata of the content uploaded to an SNS server associated with the user; and providing the recommended content to the user using the social metadata of the searched recommended content, wherein the providing of the recommended content to the user comprises:

calculating a recommendation value using predetermined weighting of the social metadata comprising a ranking of the social metadata with respect to the generated event metadata, and providing the recommended content to the user by reflecting the calculated recommendation value, wherein the generating of the event metadata of the content selected by the user includes generating the metadata of the selected content based on metainformation input by the user, and wherein the metainformation input by the user comprises at least one of title, event name, file creator information, weather information, and location information of the selected content.

* * * * *